United States Patent
Kubo et al.

(10) Patent No.: US 7,236,519 B2
(45) Date of Patent: Jun. 26, 2007

(54) TRANSCEIVING FILTER AND COMMUNICATION DEVICE

(75) Inventors: Hiroyuki Kubo, Kusatsu (JP); Norihiro Tanaka, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 722 days.

(21) Appl. No.: 10/716,433

(22) Filed: Nov. 20, 2003

(65) Prior Publication Data

US 2004/0105490 A1 Jun. 3, 2004

(30) Foreign Application Priority Data

Nov. 29, 2002 (JP) ............................. 2002-348096
Oct. 7, 2003 (JP) ............................. 2003-348528

(51) Int. Cl.
*H04B 1/38* (2006.01)
*H04L 5/16* (2006.01)

(52) U.S. Cl. ..................... 375/219; 455/73; 455/78; 455/83; 455/334

(58) Field of Classification Search ........ 375/346–350, 375/216; 455/73, 83, 334, 78
See application file for complete search history.

(56) References Cited

U.S. PATENT DOCUMENTS 5,136,455 A * 8/1992 Billingsley .................. 361/56
5,206,779 A * 4/1993 Sato et al. .................. 361/111
5,812,933 A   9/1998 Niki
6,748,076 B1 * 6/2004 Elo ............................. 379/402
6,950,634 B2 * 9/2005 Dykstra et al. ............... 455/78
6,977,958 B1 * 12/2005 Hinman et al. .............. 375/211
2001/0031016 A1 * 10/2001 Seagraves ................... 375/264
2003/0038874 A1 * 2/2003 Plonka ......................... 348/21

FOREIGN PATENT DOCUMENTS

| EP | 0 442 259 A1 | 8/1991 |
| EP | 0 782 213 A2 | 7/1997 |
| JP | 10-215202 | 8/1998 |
| WO | WO 01/35684 A2 | 5/2001 |
| WO | WO 02/31997 A2 | 4/2002 |

* cited by examiner

*Primary Examiner*—Jay K. Patel
*Assistant Examiner*—Curtis B. Odom
(74) *Attorney, Agent, or Firm*—Dickstein Shapiro LLP

(57) ABSTRACT

First and second transmission paths are provided between a first port to which an antenna is connected and a second port to which a transceiving circuit is connected. First to fourth reception filters, an amplifier circuit, and first to fourth hybrid circuits are provided on the first transmission path. A reception signal from the antenna is transmitted from the first port to the second port via the first hybrid circuit, the first and second reception filters, the second hybrid circuit, the amplifier circuit, the third hybrid circuit, the third and fourth reception filters, and the fourth hybrid circuit in this order. This reception signal does not return to the amplifier circuit, whereby the reception signal is prevented from oscillating due to positive feedback.

11 Claims, 6 Drawing Sheets

TRANSCEIVING FILTER AND COMMUNICATION DEVICE

BACKGROUND OF THE INVENTION

1. Field of the Invention

The present invention relates to a transceiving filter for selecting a transmission signal and/or a reception signal and allowing these signals to pass. The present invention further relates to a communication device including this transceiving filter.

2. Description of the Related Art

In the past, a base station of a mobile communication system has a transceiving filter including an amplifier circuit for amplifying a reception signal between an antenna at the top of a tower and a transceiving circuit.

For example, International Application Published under the Patent Cooperation Treaty No. 02/31997 (hereinafter referred to as a patent document 1) discloses a transceiving filter including first and second transmission paths between a first port to which an antenna can be connected and a second port to which a transceiving circuit can be connected.

FIG. 6 illustrates the configuration of the above-described transceiving filter. As shown in this drawing, an antenna ANT, a transceiving circuit 10, a first transmission path P1 for allowing a reception signal to pass, and a second transmission path P2 for allowing a transmission signal to pass. Reception filters Rx1 and Rx2 with a band pass characteristic for allowing the reception signal to pass and an amplifier circuit LNA are provided on the first transmission path P1. A transmission filter Tx1 with a band attenuation characteristic for attenuating only the reception signal is provided on the second transmission path P2.

According to the above-described configuration, a reception signal input from the antenna ANT is amplified in the first transmission path P1 and transmitted to the transceiving circuit 10. A transmission signal transmitted from the transceiving circuit 10 is transmitted to the antenna ANT via the second transmission path P2.

Further, International Application Published under the Patent Cooperation Treaty No. 01/35684 (hereinafter referred to as a patent document 2) discloses a transceiving filter having a first directional circuit at a first junction of a first transmission path and a second transmission path. This first directional circuit is provided for transmitting a reception signal from a first port toward a second port via the first transmission path. The transceiving filter further has a second directional circuit at a second junction of the first transmission path and the second transmission path. The second directional circuit is provided for transmitting a transmission signal from the second port toward the first port via the second transmission path.

The first directional circuit includes at least one first circulator for transmitting the reception signal input from the first port to the amplifier circuit and transmitting the transmission signal from the second transmission path to the antenna, and the second directional circuit includes at least one second circulator for transmitting the reception signal amplified by an amplifier circuit to the second port and transmitting the transmission signal input from the second port to the second transmission path.

FIG. 5 illustrates an example configuration of the patent document 2. In this example, two reception filters Rx1 and Rx2, and an amplifier circuit LNA are provided on a first transmission path P1. A circulator 15 having first ports (1), (2), and (3) is provided at a first junction of the first transmission path P1 and a second transmission path P2. Further, a circulator 16 having second ports (1), (2), and (3) is provided at a second junction of the first transmission path P1 and the second transmission path P2. A direction from the first port (1) to the first port (2) and a direction from the first port (2) to the first port (3) are determined to be a forward direction of the circulator 15. A direction from the second port (1) to the second port (2) and a direction from the second port (2) to the second port (3) are determined to be a forward direction of the circulator 16. Subsequently, a reception signal input from a port #1 is input to the first port (2) of the circulator 15 and transmitted from the first port (3) to the first transmission path P1. The reception signal is amplified by the LNA, input to the second port (3) of the circulator 16, and output from the second port (1) to a port #2.

A transmission signal input from a transceiving circuit 10 to the port #2 is transmitted from the second port (1) to the second port (2) and further transmitted to the first port (1) of the circulator 15 via the second transmission path P2. Then, the transmission signal is transmitted from the first port (1) to the first port (2) and output to an antenna ANT via the port #1.

However, in the case of FIG. 6, the first and second transmission paths P1 and P2 are provided and the LNA is provided on the first transmission path P1. These two transmission paths often form a feedback loop. The reception filter Tx1 is provided for allowing a signal in a transmit frequency band to pass and attenuating a signal in a receive frequency band. If attenuation near this receive frequency band is inadequate, an output signal from the LNA is positively fed back to the LNA via the reception filter Rx2, the transmission filter Tx1, and the reception filter Rx1 in this order, whereby this output signal oscillates. Therefore, a large attenuation near the receive frequency band of the transmission filter Tx1 should be achieved so that the gain of the feedback loop bercomes 1 dB or less, whereby the signal oscillation reduces. In this case, it becomes necessary to increase the width of an attenuation band of the receive frequency band of the transmission filter Tx1 and/or decrease the width of a transmit frequency band of each of the reception filters Rx1 and Rx2. Consequently, the insertion loss (IL) of the transmit frequency band and/or that of the receive frequency band, and the noise figures (NF) of this transceiving filter increase. Further, the group-delay (GD) characteristic of this transceiving filter deteriorates.

Where the transceiving filter with the circulators 16 and 15 shown in FIG. 5 is used and two signals whose frequencies are different from each other are input, as transmission signals, from the transceiving circuit 10 to the circulators 16 and 15, intermodulation (IM) distortion occurs in the circulators 16 and 15, whereby IM-distortion signals are output from the second ports (2) and (3) of the circulator 16. For example, where high-power circulators are used and transmission power of 45 dBm is input to the transceiving filter, the tertiary IM-distortion level in the receive frequency band becomes high so as to be about −80 dBm. This significant IM distortion occurs due to the characteristic of ferrite used for making the transceiving filter nonreciprocal.

If a tertiary IM-distortion signal in the receive frequency band is output from the first port (2) of the circulator 15, this signal is transmitted, as a disturbing wave, from the antenna to a nearby base station. Subsequently, the reception sensitivity of the base station deteriorates. If the tertiary IM-distortion signal is output from the first port (3) of the circulator 15, it is amplified by the LNA, whereby the reception sensitivity of a base station of this transceiving filter deteriorates.

The allowable value of a tertiary IM-distortion signal generated by transmission paths of currently used systems is about −100 to −120 dBm. However, it is difficult for the transceiving filter with the above-described configuration including the circulators to maintain the allowable level.

SUMMARY OF THE INVENTION

Accordingly, it is an object of the present invention to provide a transceiving filter for reducing insertion losses in a transmit frequency band and/or receive frequency band, noise figures, deterioration of a group-delay characteristic, and oscillation operation. Further, an object of the present invention is to provide a transceiving filter that reduces intermodulation (IM) distortion so as to reduce deterioration of the reception sensitivity of the transceiving filter. Another object of the present invention is to provide a communication device using this transceiving filter.

A transceiving filter according to an aspect of the present invention comprises a first port that can be connected to an antenna, a second port that can be connected to a transceiving circuit, a first transmission path having an amplifier circuit for amplifying a reception signal and at least one reception filter for allowing a signal in a receive frequency band to pass, and a second transmission path for allowing a transmission signal to pass. The transceiving filter further comprises a first directional circuit at a first junction of the first transmission path and the second transmission path. This first directional circuit is provided for transmitting the reception signal from the first port toward the second port via the first transmission path. The transceiving filter further comprises a second directional circuit at a second junction of the first transmission path and the second transmission path. This second directional circuit is provided for transmitting the transmission signal from the second port toward the first port via the second transmission path.

The first directional circuit includes at least one first 90< hybrid circuit for transmitting the reception signal input from the first port to the amplifier circuit and transmitting the transmission signal from the second transmission path to the antenna. The second directional circuit includes at least one second 90° hybrid circuit for transmitting the reception signal amplified by the amplifier circuit to the second port and transmitting the transmission signal input from the second port to the second transmission path.

According to the present invention, positive feedback of the reception signal reduces. That is to say, the reception signal does not return to the input side of the first transmission path via the second transmission path. Subsequently, an oscillation operation of the reception signal reduces.

Therefore, it becomes unnecessary to increase the width of an attenuation band corresponding to a receive-frequency band of a transmission filter on the second transmission path and decrease the width of a pass band of the reception signal on the first transmission path. Subsequently, IL of the transmission signal and the reception signal, and NF reduce. Further, a GD characteristic of the transceiving filter increases.

When the first and second directional circuits are formed as the first and second 90° hybrid circuits, the circuit configuration of this transceiving filter is simplified. Further, where this transceiving filter is used in a base station, IM distortion is significantly reduced and the reception sensitivity of the base station is prevented from being reduced, which is different from the case where circulators are used in the transceiving filter.

Preferably, the at least one reception filter is provided in the at least one of the first and second 90° hybrid circuits.

Therefore, it becomes possible to transmit only the reception signal to the amplifier circuit and reflect only the transmission signal so as to transmit the transmission signal to the second transmission path.

A communication device according to another aspect of the present invention includes a transceiving antenna, a transceiving circuit, and the above-described transceiving filter therebetween.

Subsequently, the IL of the transmission signal and the reception signal, and the NF reduce. Further, the GD characteristic of the transceiving filter increases. Consequently, the communication device has a good communication capability so as to transmit a signal with high speed with a low data error rate.

DESCRIPTION OF THE PREFERRED EMBODIMENTS

Figure 1:
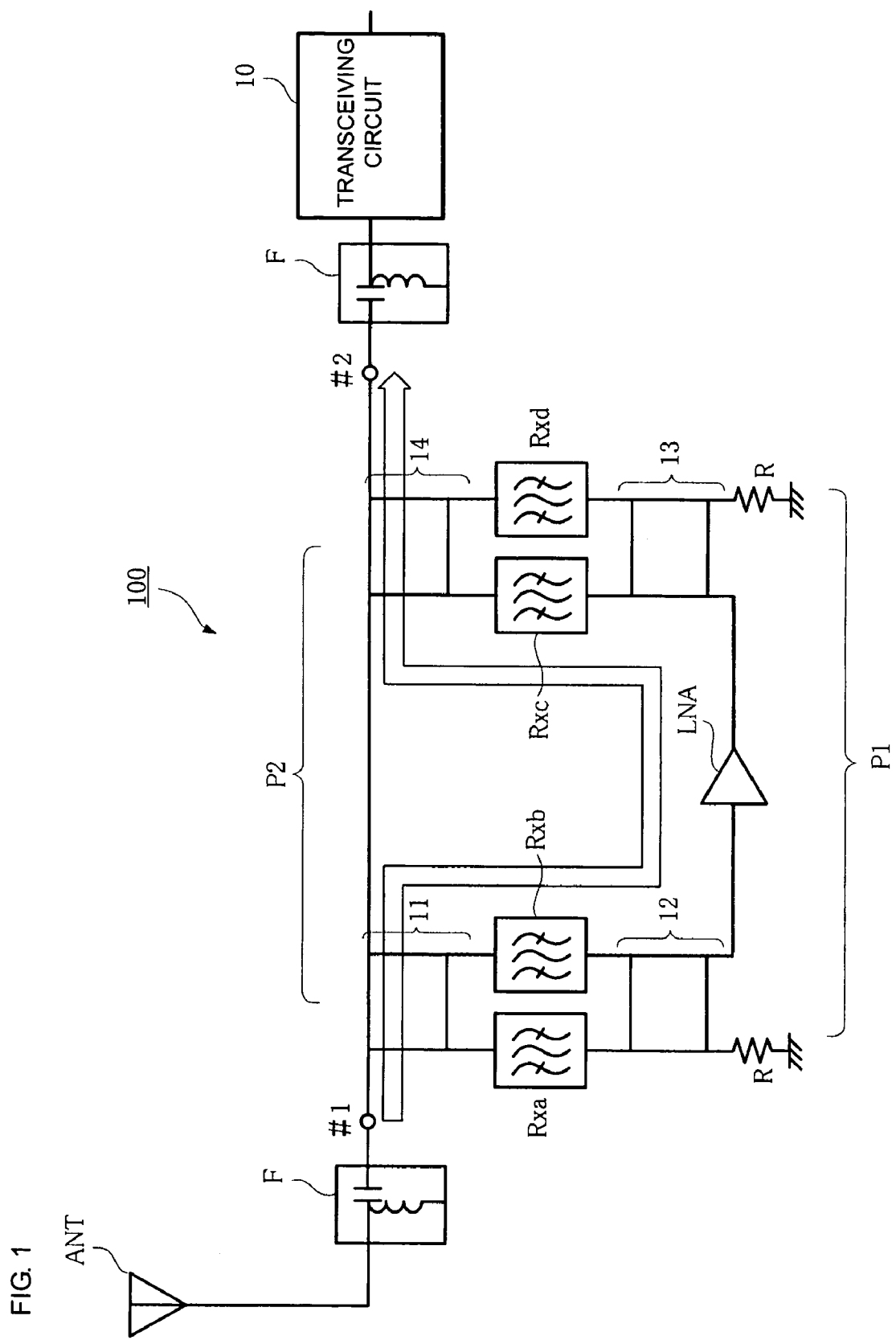
FIG. 1 is a block diagram illustrating the configuration of a communication device including a transceiving filter according to a first embodiment of the present invention.

A communication device comprising a transceiving filter 100 according to a first embodiment of the present invention will be described with reference to FIGS. 1 to 4. As shown in FIG. 1, the communication device includes an antenna ANT used for a base station and a transceiving circuit 10 for transmitting and receiving communication signals in the base station. This communication device further includes a first surge-absorbing filter F between a port #1 and the antenna ANT and a second surge-absorbing filter F between a port #2 and the transceiving circuit 10. In FIG. 1, part of the communication device except the antenna ANT, the transceiving circuit 10, and the first and second surge-absorbing filters F functions as the transceiving filter 100.

The antenna ANT is connected to the port #1 and the transceiving circuit 10 is connected to the port #2. This transceiving filter 100 and the antenna ANT are preferably provided at the top of a tower of the base station. The transceiving filter 100 further comprises reception filters Rxa, Rxb, Rxc, and Rxd. Each of these reception filters has a bandpass characteristic for allowing signals in a receive frequency band to pass and attenuating signals in a transmit frequency band. The transceiving filter 100 further comprises a low-noise amplifier circuit (LNA) and 90° hybrid circuits (hereinafter referred to as a hybrid circuit) 11, 12, 13, and 14. Each of these hybrid circuits 11 to 14 is a directional circuit for dividing power into two equal portions and transmitting a signal in a predetermined transmission direction. The power of a reception signal from the port #1 is divided into two equal portions by the hybrid circuit 11. Then, the reception signal passes the reception filters Rxa, Rxb and the hybrid circuit 12. Then, the reception signal is amplified by the LNA. The power of the reception signal is divided into two equal portions by the hybrid circuit 13. Then, the reception signal passes the reception filters Rxc and Rxd. Further, the reception signal is output to the port #2 via the hybrid circuit 14 and transmitted to the transceiving circuit 10.

Each of the hybrid circuits 11 to 14 includes two coaxial lines connected to each other. Therefore, it is not necessary to use a magnetic material including ferrite or the like, as in the case of the circulators described in the patent document 2. Since the surfaces of internal and external conductors of the coaxial lines are metallized by using a good conductor including silver or the like, intermodulation (IM) significantly reduces. Actually, where the surfaces thereof are metallized as described above, the level of IM distortion of each of these hybrid circuits becomes −125 dBm. As described above, the allowable value of the tertiary IM-distortion signal for the currently used systems is about −100 to −120 dBm. Therefore, the above-described configuration of this embodiment is adequate for achieving the allowable value of the tertiary IM-distortion signal.

Figure 2:
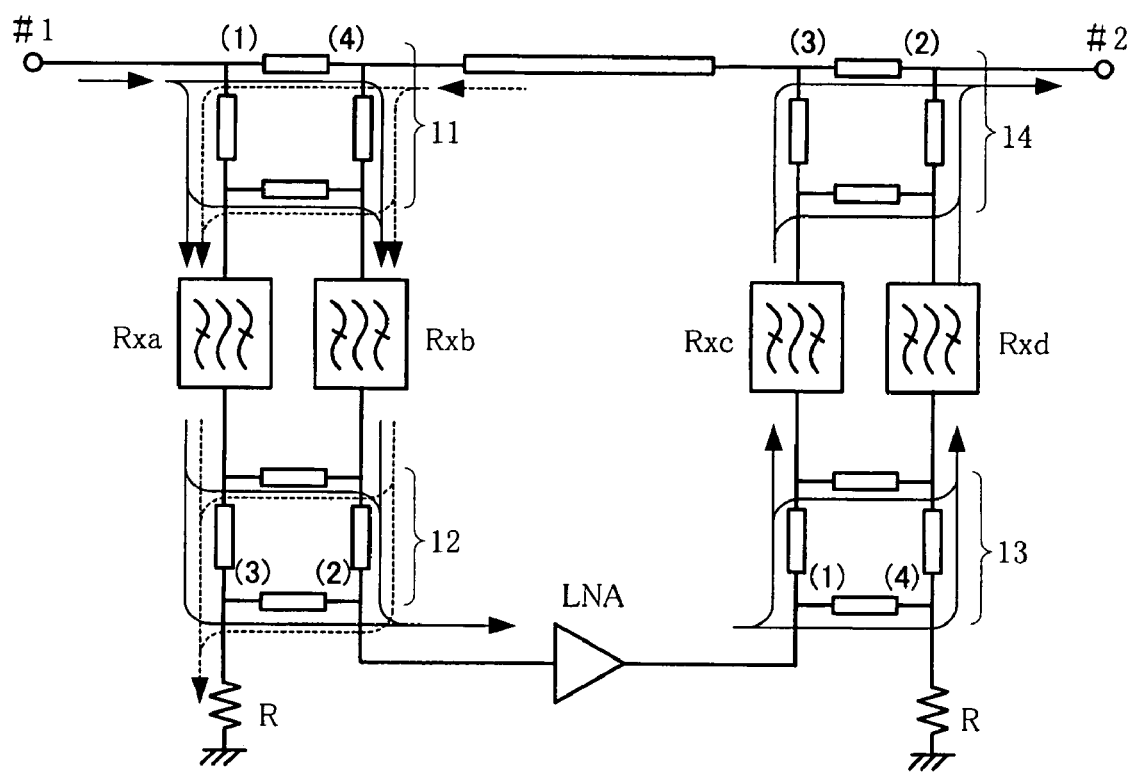
FIG. 2 is a diagram illustrating operations of hybrid circuits used in the transceiving filter.

FIG. 2 illustrates the flow of the above-described reception signal. The reception signal input from the port #1 is output to the port #2 via the hybrid circuit 11, the reception filters Rxa and Rxb, the hybrid circuit 12, the LNA, the hybrid circuit 13, the reception filters Rxc and Rxd, and the hybrid circuit 14 in this order. At this time, the hybrid circuits 11 and 12 form a double-stage hybrid circuit having a plurality of first ports (1), (2), (3), and (4). The reception filters Rxa and Rxb are provided between the hybrid circuits 11 and 12. The reception signal input from port (1) of the plurality of first ports is output to port (2) of the plurality of first ports, but not to ports (3) and (4) of the plurality of first ports.

The hybrid circuits 13 and 14 form a double-stage hybrid circuit having a plurality of second ports (1), (2), (3), and (4). The reception filters Rxc and Rxd are provided between the hybrid circuits 13 and 14. The reception signal is amplified by the LNA, input from port (1) of the plurality of second ports of this double-stage hybrid circuit, and output from port (2) of the plurality of second ports to the port #2. This reception signal is not output from ports (3) and (4) of the plurality of second ports. Therefore, this reception signal is not positively fed back to the LNA.

A transceiving filter according to a second embodiment of the present invention will now be described.

Figure 3:
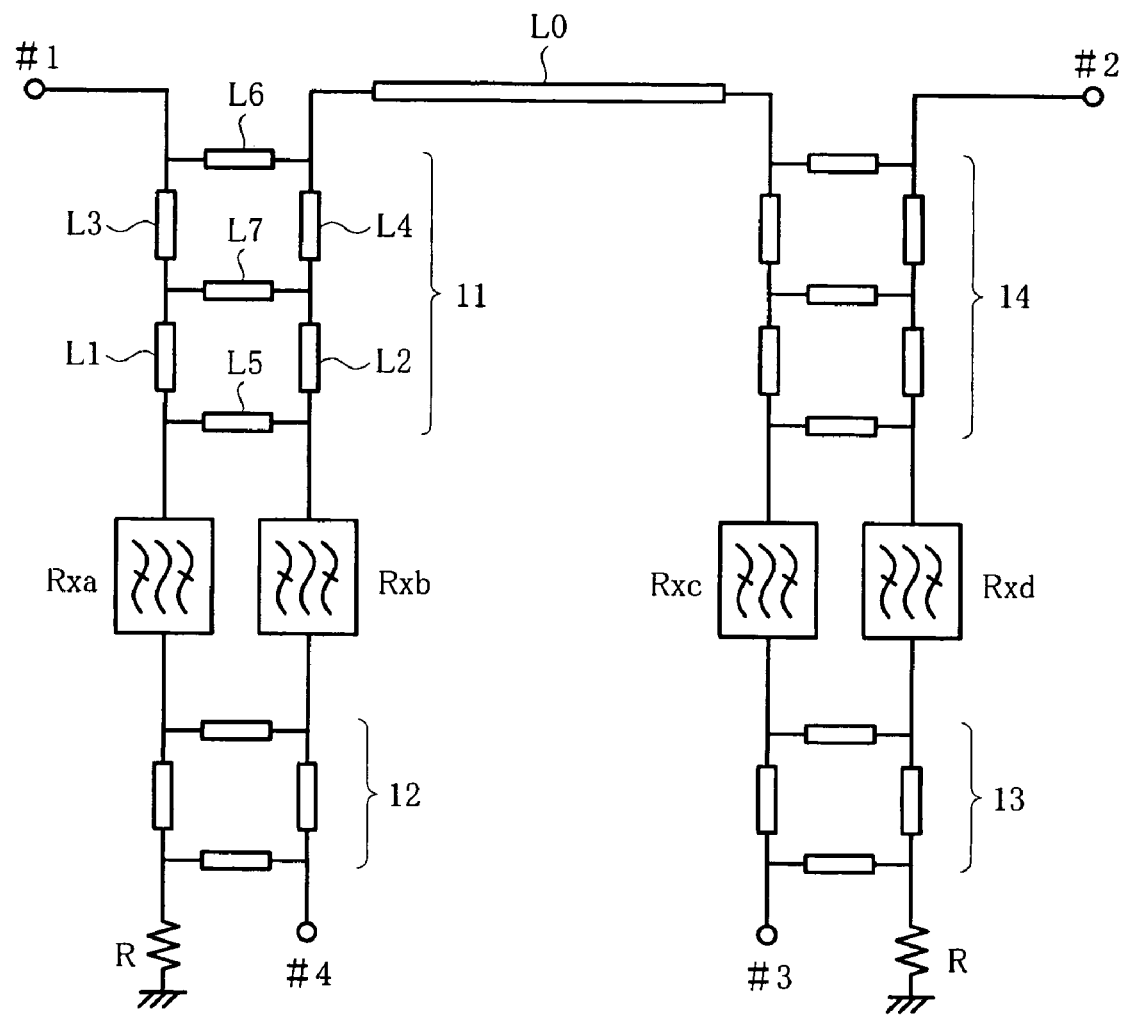
FIG. 3 is a circuit diagram for analyzing the characteristic of a transceiving filter according to a second embodiment of the present invention.
Figure 4:
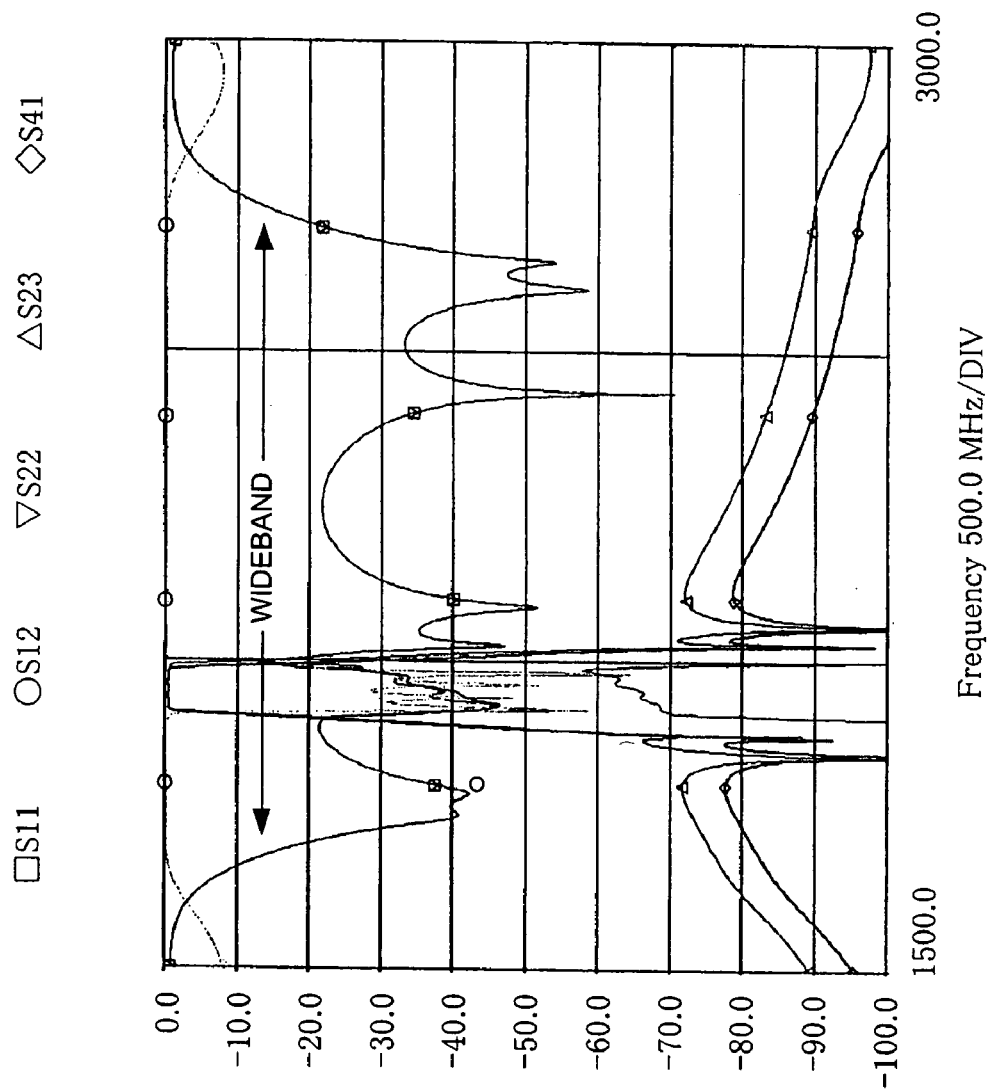
FIG. 4 is a graph illustrating the characteristic of the transceiving filter according to the second embodiment.
Figure 5:
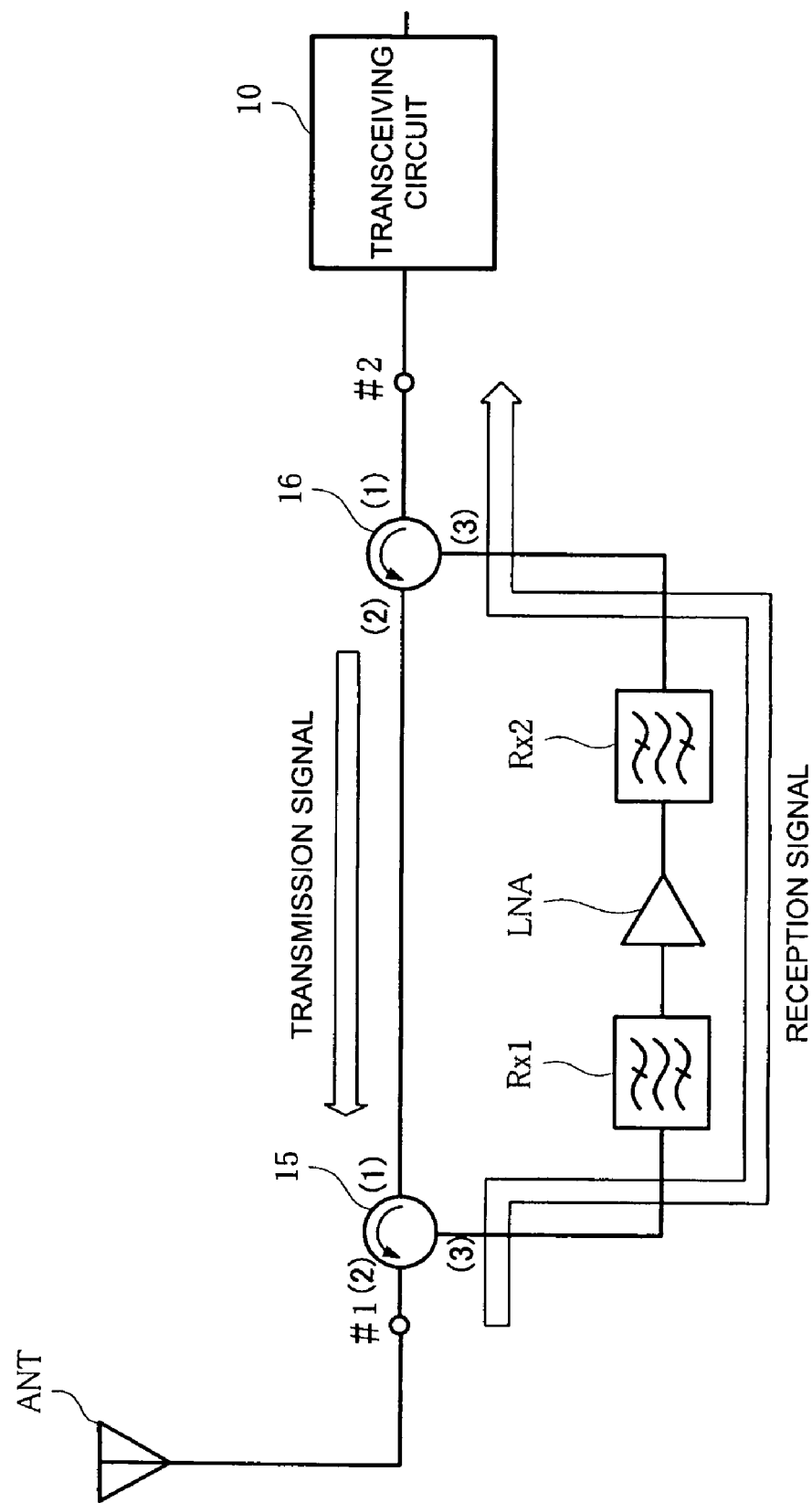
FIG. 5 is a block diagram illustrating the configuration of a communication device including a known transceiving filter.
Figure 6:
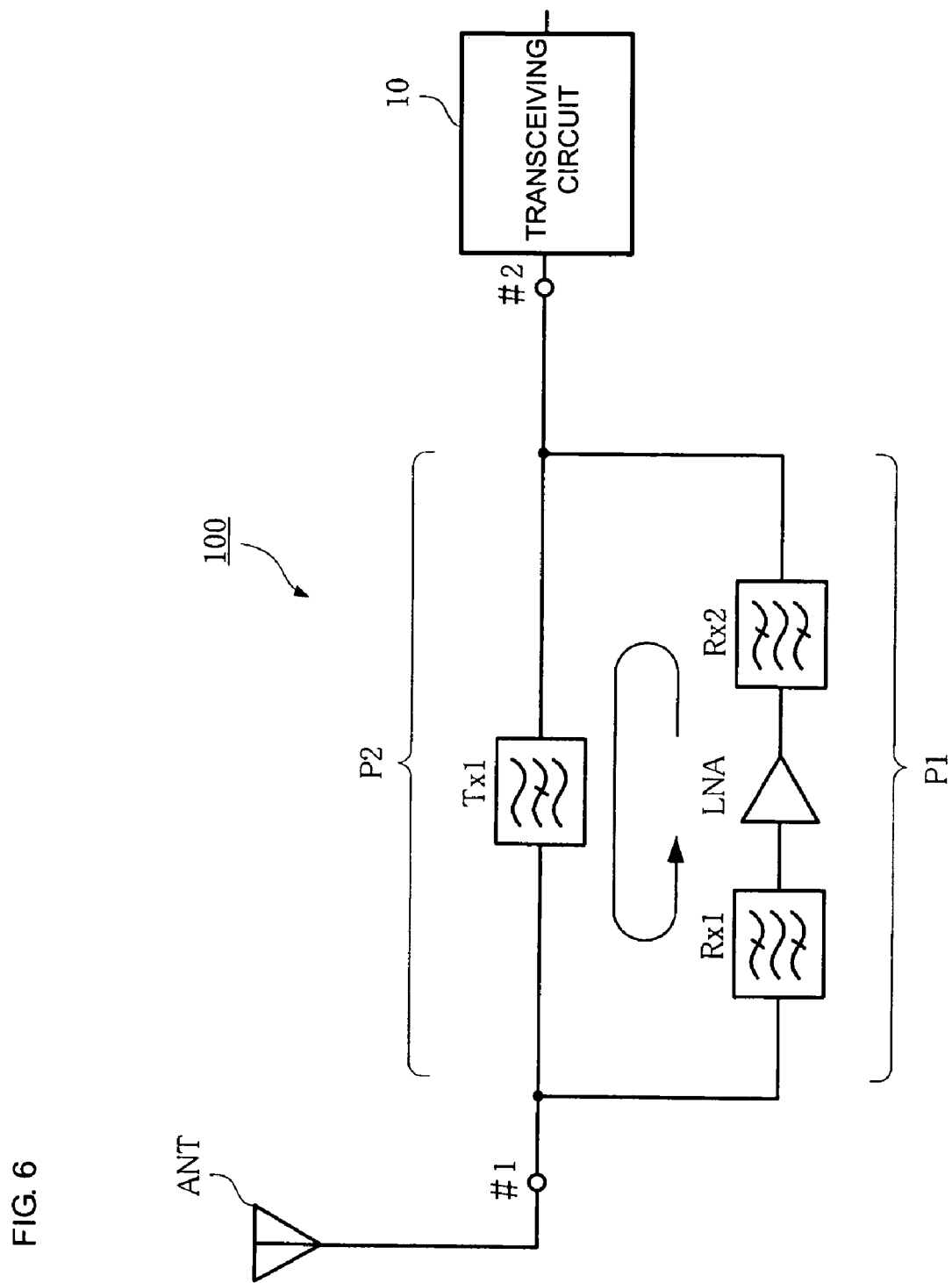
FIG. 6 is a block diagram illustrating the configuration of a communication device including another known transceiving filter.

One of the above-described double-stage hybrid circuits is provided on the input side of the LNA and the other is provided on the output side thereof in the above-described embodiment shown in FIGS. 1 and 2. However, the number of stages of these hybrid circuits can be increased. FIG. 3 illustrates an example where double-stage hybrid circuits 11 and 14 and single-stage hybrid circuits 12 and 13 are provided. The double-stage hybrid circuit 11 and the single-stage hybrid circuit 12 form a first triple-stage hybrid circuit. Further, the double-stage hybrid circuit 14 and the single-stage hybrid circuit 13 form a second triple-stage hybrid circuit. A predetermined part of the first triple-stage hybrid circuit connected to the input side of the LNA, is referred to as a port #4. A predetermined part of the second triple-stage hybrid circuit connected to the output side of the LNA, is referred to as a port #3. Subsequently, these triple-stage hybrid circuits obtain the characteristic of each of the hybrid circuits 11 and 14, and the reception filters Rxa to Rxd. FIG. 4 illustrates these characteristics. In FIG. 3, a first transmission path between the ports #1 and #2 is determined to be a line L0. A transmission frequency of each of lines L1 to L7 forming the hybrid circuit 11 preferably has an electrical wavelength of ¼ wavelength. The preferred impedance of each of the lines L1 to L7 is described below.

L1 to L4: 35.95 Ω
L5 and L6: 105.23 Ω
L7: 47.26 Ω

The configuration of the hybrid circuit 14 is preferably the same as that of the hybrid circuit 11. The characteristics of the reception filters Rxa to Rxd are preferably the same as one another.

FIG. 4 is a graph illustrating the transmission and reflection characteristics between the ports #1 to #4 shown in FIG. 3. The vertical axis of this graph illustrates transmission losses and reflection losses expressed in decibels (dB). The center frequency of a receive frequency band is 1950 MHz and a transmit frequency band does not include a frequency band of from 1920 to 1980 MHz. Here, a curve marked by squares indicates the reflection characteristic of the port #1 (characteristic S11). A curve marked by circles indicates a pass characteristic for allowing the reception signal from the port #2 to pass toward the port #1 (characteristic S12). A curve marked by downward triangles indicates the reflection characteristic of the port #2 (characteristic S22). A curve marked by upward triangles indicates a pass characteristic for allowing the reception signal from the port #3 to pass toward the port #2 (characteristic S23). A curve marked by rhombuses indicates a pass characteristic for allowing the reception signal from the port #1 to pass toward the port #4 (characteristic S41). As described above, the characteristic S12 is maintained at about 0 dB over a wide frequency band including the transmit frequency band, whereby a low-loss characteristic is obtained. Subsequently, a transmission signal is transmitted from the port #2 toward the port #1 with a low loss. The characteristics S41 and S23 are maintained at about 0 dB over a receive frequency band of from 1920 to 1980 MHz, whereby another low-loss characteristic is obtained. The reception signal input from the port #1 is transmitted toward the port #2 with a low loss.

Since the double-stage hybrid circuits 11 and 14 are provided, the pass band of the transmit frequency band increases.

In the above-described embodiments, the second transmission path P2 is formed as a line. However, a transmission filter may be inserted into the second transmission path P2 for allowing a signal in the transmit frequency band to pass through the second transmission path P2 and attenuating a signal in the receive frequency band. Subsequently, the feedback of a reception signal returning via the second transmission path P2 further decreases.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:
1. A transceiving filter comprising:
a first port;
a second port;
a first transmission path having an amplifier circuit for amplifying a reception signal;
a second transmission path for allowing a transmission signal to pass;

a first directional circuit at a first junction of the first transmission path and the second transmission path, the first directional circuit transmitting the reception signal from the first port toward the second port via the first transmission path; and a second directional circuit at a second junction of the first transmission path and the second transmission path, the second directional circuit transmitting the transmission signal from the second port toward the first port via the second transmission path, wherein the first directional circuit includes a first double stage 90° hybrid circuit for transmitting the reception signal input from the first port to the amplifier circuit and transmitting the transmission signal from the second transmission path to the first port, the first double stage 90° hybrid circuit including two reception filters having similar respective characteristics that allow a signal in a receive frequency band to pass, and wherein the second directional circuit includes a second double stage 90° hybrid circuit for transmitting the reception signal amplified by the amplifier circuit to the second port and transmitting the transmission signal input from the second port to the second transmission path, the second double stage 90° hybrid circuit including two reception filters having similar respective characteristics that allow the signal in the receive frequency band to pass.

2. The transceiving filter according to claim 1, further comprising an antenna connected to the first port and a transceiving circuit connected to the second port.

3. The transceiving filter according to claim 2, further comprising a first surge-absorbing filter between the first port and the antenna.

4. The transceiving filter according to claim 3, further comprising a second surge-absorbing filter between the second port and the transceiving circuit.

5. The transceiving filter according to claim 1, wherein at least one of the first and second directional circuits is a triple-stage hybrid circuit.

6. The transceiving filter according to claim 1, wherein both of the first and second directional circuits are triple-stage hybrid circuits.

7. A communication device comprising:
a transceiving filter comprising:
a first port;
a second port;
a first transmission path having an amplifier circuit for amplifying a reception signal;
a second transmission path for allowing a transmission signal to pass;
a first directional circuit at a first junction of the first transmission path and the second transmission path, the first directional circuit transmitting the reception signal from the first port toward the second port via the first transmission path;
a second directional circuit at a second junction of the first transmission path and the second transmission path, the second directional circuit transmitting the transmission signal from the second port toward the first port via the second transmission path,
wherein the first directional circuit includes a first double stage 90° hybrid circuit for transmitting the reception signal input from the first port to the amplifier circuit and transmitting the transmission signal from the second transmission path to the first port, the first double stage 90° hybrid circuit including two reception filters having similar respective characteristics that allow a signal in a receive frequency band to pass; and
wherein the second directional circuit includes a second double stage 90° hybrid circuit for transmitting the reception signal amplified by the amplifier circuit to the second port and transmitting the transmission signal input from the second port to the second transmission path, the second double stage 90° hybrid circuit including two reception filters having similar respective characteristics that allow the signal in the receive frequency band to pass; and
a transceiving antenna connected to the first port of the transceiving filter; and
a transceiving circuit connected to the second port of the transceiving filter.

8. The communication device according to claim 7, further comprising a first surge-absorbing filter between the first port and the transceiving antenna.

9. The communication device according to claim 8, further comprising a second surge-absorbing filter between the second port and the transceiving circuit.

10. The communication device according to claim 7, wherein at least one of the first and second directional circuits is a triple-stage hybrid circuit.

11. The communication device according to claim 7, wherein both of the first and second directional circuits are triple-stage hybrid circuits.

* * * * *